US012670493B2

(12) United States Patent
El Khiyaoui et al.

(10) Patent No.: US 12,670,493 B2
(45) Date of Patent: Jun. 30, 2026

(54) PRIVACY PRESERVING ASSET TRANSFER BETWEEN NETWORKS

(71) Applicant: International Business Machines Corporation, Armonk, NY (US)

(72) Inventors: Kaoutar El Khiyaoui, Zürich (CH); Angelo De Caro, Zürich (CH); Yacov Manevich, Beer Sheva (IL); Hagar Meir, Tel Aviv (IL); Elli Androulaki, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 17/679,549

(22) Filed: Feb. 24, 2022

(65) Prior Publication Data

US 2023/0267457 A1     Aug. 24, 2023

(51) Int. Cl.
G06Q 20/38         (2012.01)
G06Q 20/40         (2012.01)

(52) U.S. Cl.
CPC ..... G06Q 20/3825 (2013.01); G06Q 20/3827 (2013.01); G06Q 20/4014 (2013.01); G06Q 20/407 (2013.01)

(58) Field of Classification Search
CPC .......... G06Q 20/3825; G06Q 20/3827; G06Q 20/4014; G06Q 20/407
See application file for complete search history.

(56) References Cited

U.S. PATENT DOCUMENTS

| | | | | |
|---|---|---|---|---|
| 2019/0012660 | A1* | 1/2019 | Masters | .................. H04L 67/02 |
| 2020/0334668 | A1* | 10/2020 | Nicli | ..................... G06Q 20/367 |
| 2021/0119807 | A1* | 4/2021 | Chen | ..................... H04L 9/3242 |

(Continued)

FOREIGN PATENT DOCUMENTS

| | | | | |
|---|---|---|---|---|
| CA | 3137744 | A1 * | 11/2020 | .......... H04L 9/3213 |
| CN | 111160881 | A | 5/2020 | |
| CN | 108768659 | B | 5/2021 | |

OTHER PUBLICATIONS

Jeong; Implementation of real estate contract system using zero knowledge proof algorithm based blockchain; The Journal of Supercomputing, Oct. 2021, vol. 77 (10), p. 11881-11893.*

(Continued)

*Primary Examiner* — Ilse I Immanuel
(74) *Attorney, Agent, or Firm* — David K. Mattheis

(57) ABSTRACT

A method for providing privacy-preserving asset transfers between networks, by connecting to a first blockchain network, receiving login data from a user, receiving an asset pledge transaction for an asset, confirming that the user is an owner of the asset based on a previous asset transfer transaction associated with the user, verifying an availability of the asset based on first blockchain network records, determining that a recipient is a registered user of a second blockchain network, assigning the asset to a first unique identifier, receiving at least one of a pledge proof request, from the recipient prior to expiration of the deadline, and an asset reclaim transaction, from the user after expiration of the deadline, the pledge proof request and reclaim transaction each comprising the first unique identifier and responding to the at least one of the pledge proof request and the asset reclaim request according to the deadline.

17 Claims, 4 Drawing Sheets

(56)                    References Cited

U.S. PATENT DOCUMENTS

2023/0049512 A1\*    2/2023   Mandal ................ H04L 9/3239

OTHER PUBLICATIONS

"Enabling Cross-Border High Value Transfer Using Distributed Ledger Technologies", Jasper—Ubin Design Paper, 44 pps., Copyright © 2019 Accenture, All rights reserved. <https://www.accenture.com/_acnmedia/pdf-99/accenture-cross-border-distributed-ledger-technologies.pdf>.

Amiri et al., "SEPAR: Towards Regulating Future of Work Multi-Platform Crowdworking Environments with Privacy Guarantees",28 pps., arXiv:2005.01038v2 [cs.DB] Oct. 21, 2020, <https://arxiv.org/pdf/2005.01038.pdf>.

Androulaki et al., "Privacy-preserving auditable token payments in a permissioned blockchain system", 13 pps., AFT '20, Oct. 21-23, 2020, New York, NY, USA © 2020 Association for Computing Machinery, ACM ISBN 978-1-4503-8139-0/20/10, <https://dl.acm.org/doi/10.1145/3419614.3423259>.

Eberhardt, "Scalable and Privacy-preserving O-chain Computations", 23. Apr. 2021, Berlin 2021, 298 pps., <https://www.depositonce.tu-berlin.de/bitstream/11303/13087/4/eberhardt_jacob.pdf>.

Engelmann, "SwapCT: Swap Confidential Transactions for Privacy-Preserving Multi-Token Exchanges", Proceedings on Privacy Enhancing Technologies 2021, 21 pps., <https://eprint.iacr.org/2021/631.pdf>.

Mell et al., "The NIST Definition of Cloud Computing", National Institute of Standards and Technology, U.S. Department of Commerce, NIST Special Publication 800-145, Sep. 2011, 7 pages.

\* cited by examiner

START

RECEIVE USER LOGIN CREDENTIALS 210

RECEIVE A PLEDGE TRANSACTION 220

VERIFY ASSET OWNERSHIP 230

VERIFY ASSET AVAILABILITY 240

VERIFY RECIPIENT 250

ASSIGN THE ASSET TO THE PLEDGE SCRIPT 260

RECEIVE A PLEDGE PROOF REQUEST OR RECLAIM TRANSACTION 270

RESPOND ACCORDING TO THE DEADLINE 280

200

54N

54C

54B

54A

50

10

PRIVACY PRESERVING ASSET TRANSFER BETWEEN NETWORKS

TECHNICAL FIELD

This application generally relates to a database storage system, and more particularly, relates to privacy preserving asset transfers between networks.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

Computing nodes in a blockchain network may be used to perform asset transfer operations between users across multiple networks. Securities trading, supply chain transactions, virtual payments are different forms of asset transfer operations, with a privacy being a non-negotiable requirement in most of these cases. Some existing solutions attempt to tackle the issues of the privacy by leveraging zero-knowledge proofs to help nodes in the blockchain to assess the validity of transactions without learning their content.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable privacy preserving asset transactions between different networks.

A method for preserving the privacy of asset transfer data associated with asset transfers between blockchain networks by connecting to a first blockchain network configured to store user assets, the first blockchain network in communication with a second blockchain network, receiving login data from a user, receiving an asset pledge transaction for an asset from the user identified by the login data, the asset pledge transaction including a first unique identifier of the asset token, a digital signature of the user, and identification data of: a recipient, a deadline, the second blockchain network as a destination network, a second unique identifier of the asset, confirming that the user is an owner of the asset based on a previous asset transfer transaction associated with the user, verifying an availability of the asset based on first blockchain network records, determining that the recipient is a registered user of the second blockchain network, assigning the asset to the first unique identifier of the asset pledge transaction, receiving at least one of a pledge proof request, from the recipient prior to expiration of the deadline, and an asset reclaim transaction, from the user after expiration of the deadline, the pledge proof request and reclaim transaction each comprising the first unique identifier and responding to the at least one of the pledge proof request and the asset reclaim request according to the deadline.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
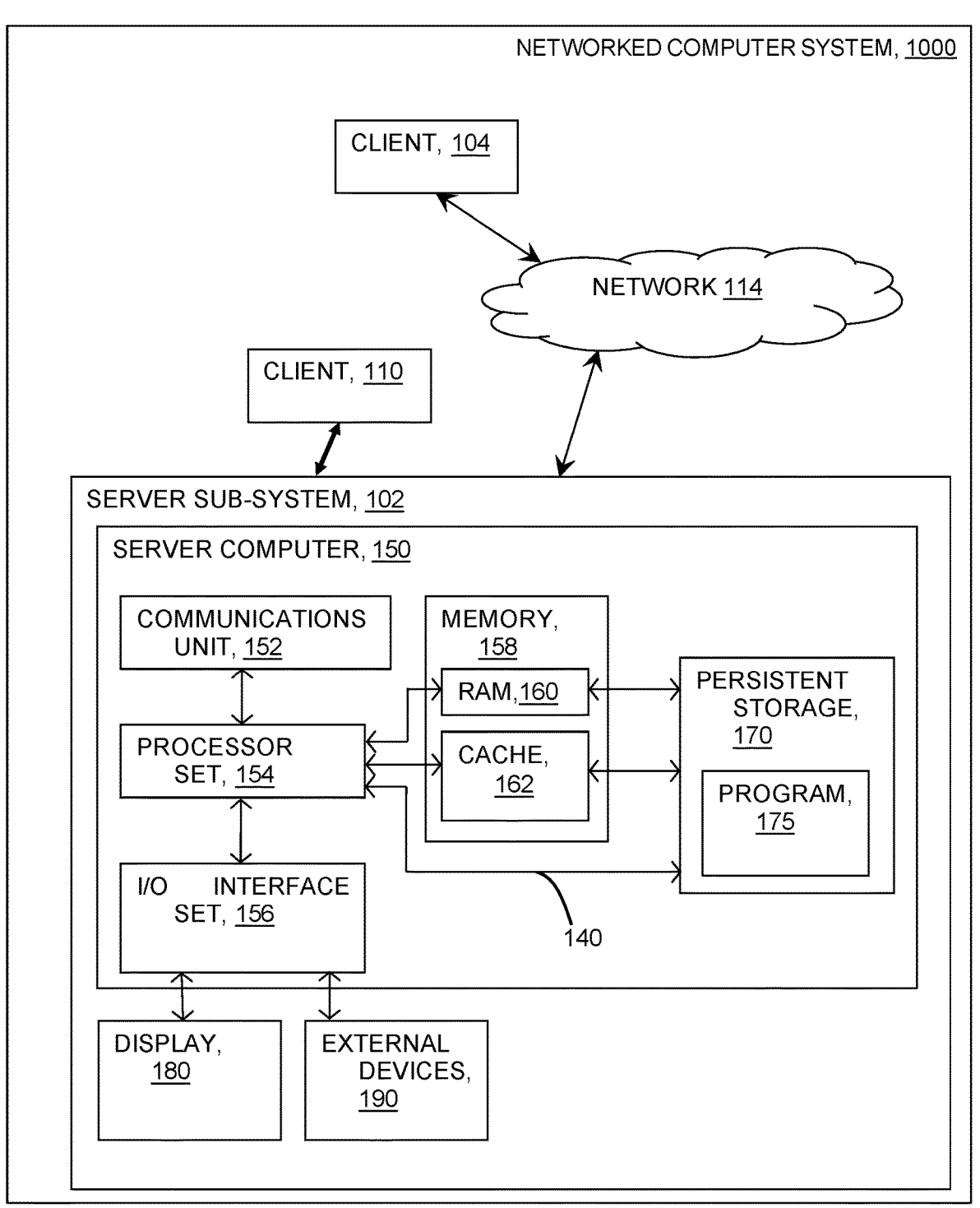
FIG. 1 provides a schematic illustration of a computing environment, according to an embodiment of the invention.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

The privacy guarantees of zero-knowledge proofs come at the expense of performance. These proofs are generally computationally expensive for both the prover and the verifier, with the only exception being SNARK-based solutions (e.g., Zerocash) that enjoy a lightweight verification at the cost of an expensive proof generation. The main drawback of the SNARK-based solution is the requirement of a trusted setup that cannot easily be distributed. Without a distributed setup, the security of such schemes cannot be ensured, and their adoption may be limited. Further, not all assets are held upon a single network and a privacy preserving method for the transfer of assets from a first network to a second network is desired. Example embodiments provide methods, systems, components, non-transitory computer readable media, devices, and/or networks, which provide for preserving the privacy of asset transfer data related to asset transfers between respective blockchain networks.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native crypto-currency and use consensus based on various protocols such as Proof of Work (PoW). On the other hand, a permissioned blockchain database provides a system which can secure inter-actions among a group of entities which share a common goal, but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and crypto-graphically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for documenting asset transfer data for transfers between different blockchain networks, while also preserving asset and participant privacy. The exemplary embodiments solve the issues of time and trust by extending features of a set of databases such as immutability, digital signatures and providing a single source of truth. The exemplary embodiments provide a solution for preserving privacy for data associated with asset transfers between different blockchain-based networks. The blockchain networks may be homogenous based on the asset type and rules that govern the assets based on the smart contracts.

In an embodiment, each blockchain is associated with a unique oracle public key (PK). Cross-network transfers are authorized in each of the source and destination networks if they accept their respective public keys. Acceptance may be tied to the validation by a threshold number of nodes. The network public keys can be distributed across the nodes of a blockchain using threshold signatures. Time, across all participating networks and for all participants, is divided into epochs, each epoch having a duration of delta. For a pledge transaction, a deadline is defined in terms of a system temporal parameter T, where Deadline=Pledgetime+T Pledgetime corresponds to a particular epoch corresponding to the pledge transaction. As a result, all cross-network token transfers occurring in a single epoch will have the same deadline.

One of the benefits of the example embodiments is that it improves the functionality of a computing system by implementing a method for providing privacy-preserving asset transfers between blockchain-based systems. Through the blockchain system described herein, a computing system can perform functionality for determination that the asset recipient is the registered user of a relevant blockchain, for encoding the asset transfer transactions by a public key associated with a private key of an auditor of a blockchain, and for providing the encoded asset transfer transaction to the auditor for auditing in blockchain networks by providing access to capabilities such as distributed ledger, peers, encryption technologies, MSP, event handling, etc. Also, the blockchains enable the creation of a business network and make enable users or organizations to on-board for participation. As such, the blockchain is not just a database. The blockchain comes with capabilities to create a Business Network of users and on-board/off-board organizations to collaborate and execute service processes in the form of smart contracts.

The example embodiments provide numerous benefits over a traditional database. For example, through the blockchains the embodiments provide for immutable accountability, security, privacy, permitted decentralization, availability of smart contracts, endorsements and accessibility that are inherent and unique to the blockchains.

A traditional database could not be used to implement the example embodiments because it does not bring all parties on the business network, it does not create trusted collaboration and does not provide for an efficient storage of digital assets. The traditional database does not provide for a tamper proof storage and does not provide for preservation of the digital assets being stored. Thus, the proposed method for preserving the privacy of data associated with asset transfers between in blockchain networks cannot be implemented in the traditional database.

If a traditional database were to be used to implement the example embodiments, the example embodiments would have suffered from unnecessary drawbacks such as search capability, lack of security and slow speed of transactions. Additionally, the automated method for preserving the privacy of asset transfer data for transfers between blockchain network, would simply not be possible.

Accordingly, the example embodiments provide for a specific solution to a problem in the arts/field of access to asset-related data for assets transferred between blockchain networks.

The example embodiments also change how data may be stored within a block structure of the blockchain. For example, digital asset data may be securely stored within a certain portion of the data block (i.e., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having a personal data associated with the digital asset not stored together with the assets within a traditional block structure of a blockchain. By removing the personal data associated with the digital asset, the blockchain can provide the benefit of anonymity based on immutable accountability and security.

Exemplary embodiments disclose a system for efficient privacy-preserving asset management for asset transfers.

The assets may be represented as hiding commitments that encode asset information such as an asset sender, an asset recipient, a deadline, an asset source network, an asset destination network, an asset type and an asset value, among other things. Then, the sender of an asset may use zero-knowledge proofs to prove that the asset being transferred is legitimate (i.e., has been previously recorded in the blockchain), to establish that the asset sender is the rightful owner of the asset being sent, to prove that the asset sender is not changing the value of the asset (not increasing its value, nor modifying its type) to prove that the recipient is a registered user of an authorized destination blockchain, that the source network corresponds to the blockchain to which the asset belongs, and that the destination is an authorized blockchain. The sender may first encrypt the information encoded in the hiding commitment under the public keys of the auditors in the source and destination networks using the public keys of the auditors, and then may use zero-knowledge proofs to show that the encryption has been performed correctly.

According to one exemplary embodiment, each user of the network of blockchain systems is assigned a tuple of attributes that correspond to the user's name, user's public key and the public key of the user's assigned auditor. When a user enrolls to an authorized blockchain, the issuer associated with that blockchain signs the user's attributes using Groth signature, such that a binding between these attributes is established. The encoding of a pledged asset may be performed by mapping assets to Pedersen commitments that encode the identities of the asset sender and the asset recipient, the transaction deadline, the source blockchain, the destination blockchain, the type and the value of the asset, and a unique serial number selected by the sender that is leveraged later to counter double-spending.

When a user wishes to transfer an asset across networks, among other things, the user proves that the asset being transferred was previously received by the user in a previously-recorded transfer. In one embodiment, this is achieved using RSA accumulators that can be tailored to produce zero-knowledge (ZK) proofs of membership. Using such proofs, the sender of the asset is able to show, in a privacy-preserving manner, that the asset being transferred corresponds to an asset recorded on the blockchain. Thus, asset integrity is efficiently verified.

In addition to establishing that the asset being transferred is recorded in the ledger, the sender proves a rightful ownership of the asset. Proving rightful ownership of the asset may involve showing that the sender knows the secret key of the owner of the asset. In one embodiment, this may be performed using Schnorr ZK proofs that assert that the sender knows the secret key of the owner encoded in the Pedersen commitment of the asset being pledged for another network. The sender also proves that the asset was not spent before, preventing double spending of the same asset. This may be realized using secure serial numbers that uniquely identify assets. Such secure serial number should be collision resistant (i.e., two assets are assigned two different serial numbers) and deterministic (i.e., the same asset yields the same serial number). In this manner, attempts by a malicious owner to transfer an asset twice will be prevented, and an honest owner will never be accused of double-spending. Moreover, the exemplary embodiment will ensure that only the owner of the asset produces a valid pledge transaction and pledge serial number and that the serial number cannot be linked to the asset being spent. This may be achieved, for example, by a combination of the verifiable PRF introduced by Dodis and Yampolisky and Groth-Sahai and Schnorr ZK proofs, providing verification of the asset integrity.

The consistency of the asset being pledged may be achieved by preventing the sender from increasing the value of the asset and from changing its type and by preventing the sender from transferring the ownership of the asset to an unauthorized recipient (i.e., a recipient that in not a registered user of the destination blockchain system). In one embodiment this is achieved by coupling Schnorr and Groth-Sahai ZK proofs, such that the former proofs are used to ensure that input and output assets are consistent in terms of value and type, while the latter proofs are used to demonstrate that the recipient of the asset is a legitimate user of the destination network.

In an embodiment, a first user, Alice, wants to transfer an asset held on a network A, to a second user Bob, who is an authorized user of network B. In this embodiment, Alice submits login credentials to network A, and after successfully being recognized by network A, submits a pledge transaction for the asset having a unique serial number of SN, which Alice shares with Bob, outside the blockchain networks.

In this embodiment, Alice submits a pledge transaction to network A for transfer of the asset SN, to Bob on network B. The pledge transaction includes (SN', Com', Com, ZKP, Sig) such that SN' is a unique identifier associated with the pledge transaction of the asset and derived using the private key of the sender together with a random seed encoded in the asset, Com' is a randomization of a zero-knowledge asset transfer token (ZKAT), which is a hiding commitment associated with the asset including (owner, type, value, seed), Com is the pledged token, which is defined as a hiding commitment of (sender, recipient, deadline, source, destination, type, value, SN), where SN is a unique identifier for the asset known by the owner (Alice) and shared by Alice with Bob, and recipient is Bob's identity on network B.

In an embodiment, the ZKAT token comprises a hiding commitment of (owner, type, value, SN) for the asset. Using the ZKAT protocol, ZKP shows that asset type and value are preserved across the pledge transaction, and that asset serial number SN' is correct according to the information encoded in the token being pledged.

ZKP are zero-knowledge proofs, showing that Com' is a randomization of an existing token, SN' is the serial number of the randomized token, Com and Com' encode the same type and value for the token, sender in Com is the owner encoded in Com', Com encodes in source the public key of the source network, Com encodes in destination the public key of an authorized destination network. The ZKP leverages membership proofs or one-out-of-many proofs to show that Com correctly encoded one of the authorized networks as a destination.

Sig is the anonymous signature of the owner encoded in Com' and it is derived using the private key of that owner, Alice.

Upon receipt of the pledge transaction from Alice, network A validates the transaction by determining if SN' appears in the ledger of network A. If so, then the transaction is rejected, as a double spending attack is detected. Next, network A checks if the ZKP is valid. Notably, network A checks that the destination is an authorized network by leveraging one-out-of-many proofs or membership proofs. It may also check if the recipient is an authorized user in the destination network by verifying if the recipient has a valid credential in that network. Using anonymous signature Sig, network A verifies if that that signature verifies under the public key of the owner encode in Com'. The nodes of network A validate ownership and verify Bobs' authorization without learning the identity of either Alice of Bob, thanks to zero-knowledge proofs. After validation of token ownership and authorization of the recipient, the nodes of network A add serial number SN' and Com to the ledger. From this point onward, Alice can transfer the pledged token only if Bob does not claim it in network B before the deadline encoded in Com, meaning that any further attempt by Alice to transfer the token before the deadline elapses or after Bob claims the token will fail as the network no longer considers Alice to be the owner of the token.

Subsequent to Alice submitting the pledge transaction to network A, Alice communicates to Bob that a pledge has taken place. Bob accordingly submits a pledge proof request to network A nodes regarding the pledged token. The nodes respond with a network A signature of the content of the token establishing that the token does exist on network A.

Bob then utilizes the SN provided by Alice and the signature of the pledge proof to submit a claim transaction to network B. The claim transaction includes (SN, Com, Com', deadline, ZKP, Sig) wherein Com is a randomization of a pledged token identified using SN, Com' is a ZKAT token encoding the recipient of Com as the owner and having the same type and value as the token pledged by Alice in Com, the deadline is the same as pledged by Alice and is encoded in Com, and Sig is the anonymous signature of Bob, derived using Bob's private key.

For the claim transactions, the ZKP show that Com' is computed correctly showing the recipient of Com as the owner and having the correct type and value as Com. Com encodes SN, destination in Com encodes the public key of the receiving network, source in Com encodes the public key of an authorized network, deadline is the deadline in Com, and that there is a valid signature for the token of Com from the source network.

Upon receiving the claim transaction from Bob, the nodes of network B validate the claim by determining if the deadline has passed/elapsed, check if an asset of identifier SN is stored in the network B ledger—finding the SN leads to a transaction failure thereby preventing any attempt by Bob to claim the asset more than once. The nodes check the validity of the pledge proof, validate the signature using one-out-of-many proofs that the signature is one of an authorized network without revealing which network is the source of the asset. For claim requests before the end of a deadline having a proper pledge proof and no previous attempt to claim the token, the nodes add SN and token Com' having Bob as the owner to the ledger. The ledger entry reflects Bob as the owner anonymously. Therefore, Alice has transferred the asset from network A to Bob on network B without revealing the sender of the asset or the source of the asset to the destination nodes or revealing the recipient of the asset or the destination of the transfer to the source nodes.

Deadline establishes a time window within which the recipient must claim the asset or forfeit the opportunity to do so. After the deadline period has elapsed and the window has closed, the sender may submit a reclaim transaction, in the example, Alice may submit a reclaim transaction to the nodes of network A. Alice begins by submitting a reclaim proof request to network B for asset SN. For assets not found on the network, the trusted nodes of network B return a trusted signature generated using the private key of network B for the asset identifier SN and the deadline.

After receiving the reclaim proof, Alice submits a reclaim transaction to network A. The reclaim transaction includes (SN, Com, Com', deadline, ZKP, Sig), where SN is the unique asset serial number, Com is a randomization of the pledged token, Com' is a ZKAT that encodes the sender in Com as owner and has the same asset type and asset value as Com. Sig is the anonymous signature of the sender, Alice, and ZKP includes zero-knowledge proofs that Com is a randomization of a recorded token identified by SN, Com' is computed correctly, there is a valid signature under the destination public key for the pair SN, deadline, and Com encodes the deadline.

Upon receiving the reclaim transaction, network A verifies that the owner of the output token of reclaim corresponds to the sender of the pledged token, the value and type of the output token is the same as the value and type of the pledged token, and the reclaim proof is valid (i.e., the pledged token was not claimed in the destination network identified in the pledged token). If all checks are successful, then the pledged token is deleted and the output token is added to the ledger having Alice as the owner.

In an embodiment, a blockchain architecture may include certain blockchain elements, for example, a group of blockchain nodes. These nodes participate in a number of activities, such as blockchain transaction addition and validation process (consensus). One or more of the blockchain nodes may endorse transactions based on endorsement policy and may provide an ordering service for all blockchain nodes in the architecture. A blockchain node may initiate a blockchain authentication and seek to write to a blockchain immutable ledger stored in blockchain layer, a copy of which may also be stored on the underpinning physical infrastructure. The blockchain configuration may include one or more applications which are linked to application programming interfaces (APIs) to access and execute stored program/application code (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes.

The blockchain bases or platforms may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layers may expose an interface that provides access to the virtual execution environment necessary to process the program code and engage the physical infrastructure. Cryptographic trust services may be used to verify transactions such as asset exchange transactions and keep information private.

The blockchain architecture configuration may process and execute program/application code via one or more interfaces exposed, and services provided, by the blockchain platforms. The code may control blockchain assets. For example, the code can store and transfer data, and may be executed by nodes in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the asset transfer request information may be processed by one or more processing entities (e.g., virtual machines) included in the blockchain layer. The result may include data blocks reflecting the transactional data of completed asset transfer, encrypted to provide enforced auditability of the asset transfer transaction. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment and then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. An asset transfer request may include execution of the smart contract. One function may be to commit a transaction related to execution of the smart contract on the ledger to store the asset transfer transaction encrypted to provide enforced auditability, which may be provided to one or more of the nodes.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise timeseries data set selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the cross-network asset transfer program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., cross-network asset transfer program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
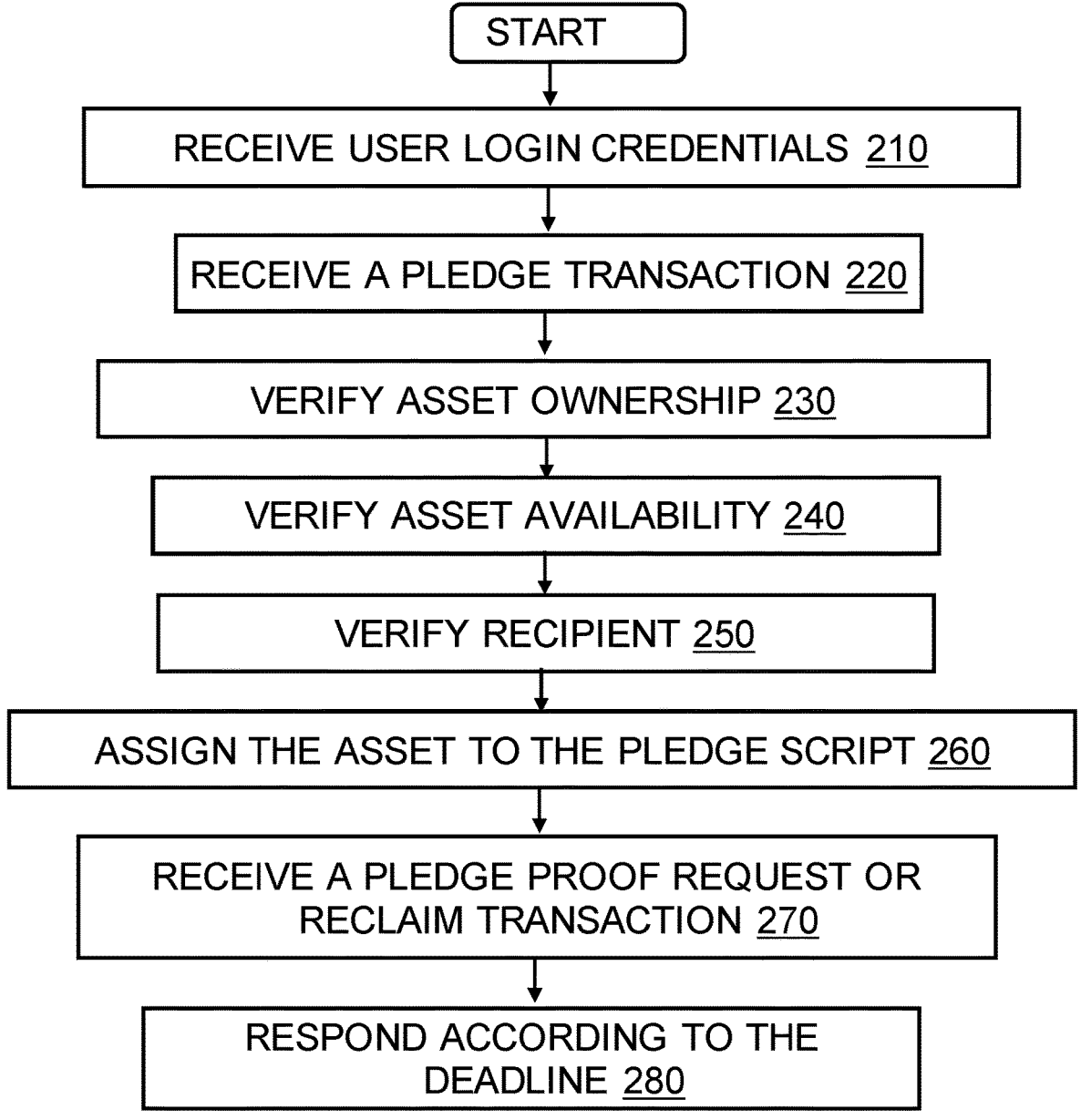
FIG. 2 provides a flowchart depicting an operational sequence, according to an embodiment of the invention.

FIG. 2 provides a flowchart 200, illustrating exemplary activities associated with the practice of the disclosure. After program start at block 210, the method receives login credential information from a user, such as Alice, attempting to aces the blockchain network A. After verifying the user's credentials the network is ready to receive transaction scripts from the user.

At block 220, the method receives a pledge transaction script, or pledge script, from the user. The pledge transaction script includes a unique pledge transaction identifier for an asset as well as identifying information regarding the sender/owner of the asset, the recipient of the asset, a source network, destination network, transaction deadline, asset type, asset value, a second unique identifier for the asset provided by the owner, and a signature of the owner/sender, zero-knowledge proofs related to the transaction, and a zero-knowledge token associated with the asset.

At block 230, the method verifies the asset ownership provided in the pledge transaction script based upon previous blockchain transaction records and the owner signature provided in the pledge transaction script.

At block 240, the method verifies the availability of the token for transfer and ensures that the token is not locked due to another transaction using a unique identifier of the asset.

At block 250, the method verifies that the recipient of the pledge transaction is an authorized user of a connected blockchain network, using a unique user identifier for the recipient on their blockchain network. (The recipient provides their unique identifier to the sender through a separate communications channel.)

At block 260, the method assigns the asset to the pledge transaction script and the unique pledge transaction identifier. At this point the asset is no longer available for further transactions by the owner as it is now assigned to the pledge transaction script, not the previous owner.

At block 270, the method receives at least one of a pledge proof request from the recipient, or a reclaim transaction from the user. The pledge proof request includes the first unique identifier for the asset provided by the owner to the recipient through a separate communications channel. The pledge proof request is provided anonymously by the recipient using a public-private key pair signature for the recipient. The reclaim transaction also includes the first unique identifier and reclaim proof information among other things.

At block 280, the method responds to pledge proof requests submitted prior to the expiration of the deadline with a digital signature including the unique identifier, and processes reclaim requests submitted after the deadline with a valid reclaim proof, by transferring the asset from the pledge script to the user.

Throughout the method, the respective transaction maintain the private nature of the content of the assets transferred, the identities of the transaction participants, or the inputs of the transactions. The respective pledge, claim and reclaim transactions cannot be linked through information available to holders of the respective ledgers of the various blockchains. Transfers having the same deadline across networks appear indistinguishable from each other.

Over the course of the transaction, the pledge, claim and reclaim transactions do not reveal information about the source or destination networks. The nodes in the destination network verify the pledge proof without learning the origin network for the asset of the transaction. The nodes of the source network verify the reclaim proof without learning the user associated with the reclaim request. Deadlines for the claim and reclaim do not leak information regarding the source and destination networks.

Networked blockchains may reside upon a single computing device or may be configured across multiple networked computing services including configurations wherein networked blockchains reside upon cloud computing resources while maintaining the required communications connections between respective blockchain networks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
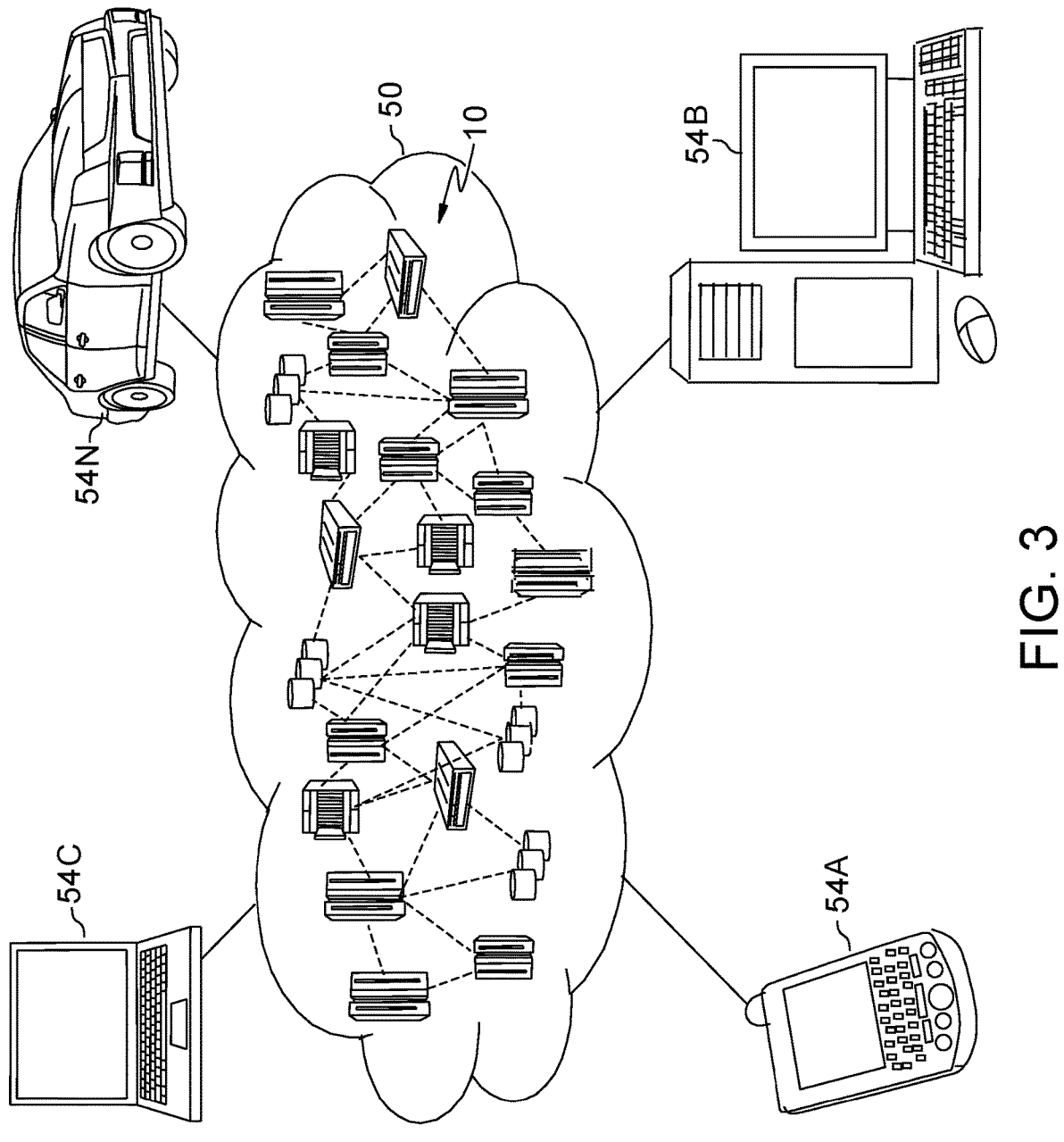
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
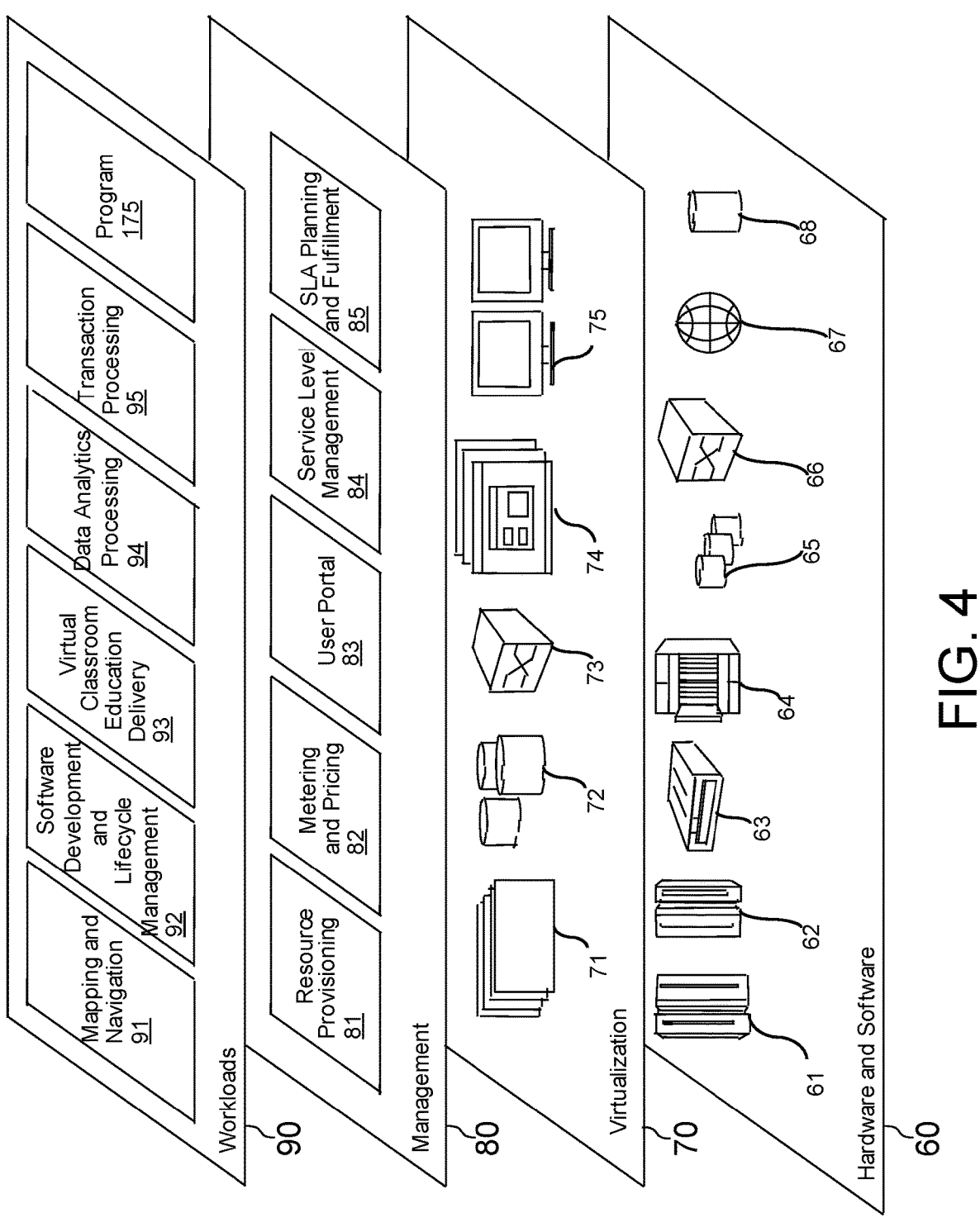
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cross-network asset transfer program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system, comprising:

a processor;

a memory on which are stored machine-readable instructions that when executed by the processor, cause the processor to:

connect to a first blockchain network configured to store user assets, the first blockchain network in communication with a second blockchain network;

receive login data from a user;

receive an asset pledge transaction for an asset on the first blockchain network from the user identified by the login data, the asset pledge transaction including i) a first unique identifier of the asset, ii) a digital signature of the user, iii) identification data of: the user, a recipient, a deadline, the first blockchain network, the second blockchain network as a destination network, asset type, asset value, a second unique identifier of the asset, iv) a randomization of a zero-knowledge asset transfer token (ZKAT) encoding the user as an owner of the asset, and v) a first zero-knowledge proof (ZKP) showing that the second unique identifier is a randomization of an existing token of the first blockchain network;

confirm that the user is an owner of the asset based on a previous asset transfer transaction associated with the user;

verify availability of the asset based on the ZKP and first blockchain network records;

determine that the recipient is a registered user of the second blockchain network;

assign the asset to the first unique identifier of an asset pledge script;

receive a pledge proof request, from the recipient prior to expiration of the deadline, the pledge proof request comprising the first unique identifier; and respond to the pledge proof request with a signature of the first blockchain network;

receive, by a second participating node of the second blockchain network, a claim transaction including the second unique identifier of the asset, the deadline, a second ZKAT encoding the recipient as an owner of the asset, a second ZKP, and a signature of the recipient; and add, by the second participating node of the second blockchain network, the second ZKAT, and the second unique identifier of the asset to the second blockchain network.

2. The system of claim 1, wherein the asset pledge comprises the first unique identifier that allows the network to identify the pledged token and sign its content.

3. The system of claim 1, wherein the first unique identifier is determined according to at least a private key of the user.

4. The system of claim 1, wherein the identification data of: the user, a recipient, a deadline, the first blockchain network, the second blockchain network as a destination network, asset type, asset value, a second unique identifier of the asset comprises a hiding commitment of the user, the recipient, the deadline, the first blockchain network, the second blockchain network, the asset type, and the asset value, and the second unique identifier.

5. The system of claim 1, wherein digital signature of the user comprises an anonymous signature.

6. The system of claim 1, wherein digital signature of the recipient comprises an anonymous signature.

7. A method, comprising:

connecting, by a participating node, to a first blockchain network configured to store user assets, the first blockchain network in communication with a second blockchain network;

receiving, by the participating node login data from a user;

receiving, by the participating node, an asset pledge transaction for an asset on the first blockchain network from the user identified by the login data, the asset pledge transaction including i) a first unique identifier of the asset, ii) a digital signature of the user, iii) identification data of: the user, a recipient, a deadline, the first blockchain network, the second blockchain network as a destination network, asset type, asset value, a second unique identifier of the asset, iv) a randomization of a zero-knowledge asset transfer token (ZKAT) encoding the user as an owner of the asset, and v) a first zero-knowledge proof (ZKP) showing that the second unique identifier is a randomization of an existing token of the first blockchain network;

confirming, by the participating node, that the user is an owner of the asset based on a previous asset transfer transaction associated with the user;

verifying, by the participating node, an availability of the asset based on the ZKP and first blockchain network records;

determining, by the participating node, that the recipient is a registered user of the second blockchain network;

assigning, by the participating node, the asset to the first unique identifier of the asset pledge transaction;

receiving, by the participating node, a pledge proof request, from the recipient prior to expiration of the deadline, the pledge proof request comprising the first unique identifier; and responding to the pledge proof request with a signature of the first blockchain network;

receiving by a second participating node of the second blockchain network, a claim transaction including the second unique identifier of the asset, the deadline, a second ZKAT encoding the recipient as an owner of the asset, a second ZKP, and a signature of the recipient; and adding, by the second participating node of the second blockchain network, the second ZKAT, and the second unique identifier of the asset to the second blockchain network.

8. The method of claim 7, wherein the asset pledge transaction further comprises the first unique identifier that allows the network to identify the pledged token and sign its content.

9. The method of claim 7, wherein the first unique identifier is determined according to at least a private key of the user.

10. The method of claim 7, wherein the identification data of: the user, a recipient, a deadline, the first blockchain network, the second blockchain network as a destination network, asset type, asset value, a second unique identifier of the asset comprises a hiding commitment of the user, the recipient, the deadline, the first blockchain network, the second blockchain network, the asset type, and the asset value, and the second unique identifier.

11. The method of claim 7, wherein digital signature of the user comprises an anonymous signature.

12. The method of claim 7, wherein digital signature of the recipient comprises an anonymous signature.

13. A non-transitory computer readable medium comprising instructions, that when read by a processor of a participating node, cause the processor to:

connect to a first blockchain network configured to store user assets, the first blockchain network in communication with a second blockchain network;

receive login data from a user;

receive an asset pledge transaction for an asset on the first blockchain network from the user identified by the login data, the asset pledge transaction including i) a first unique identifier of the asset, ii) a digital signature of the user, iii) identification data of: the user, a recipient, a deadline, the first blockchain network, the second blockchain network as a destination network, asset type, asset value, a second unique identifier of the asset, iv) a randomization of a zero-knowledge asset transfer token (ZKAT) encoding the user as an owner of the asset, and v) a first zero-knowledge proof (ZKP) showing that the second unique identifier is a randomization of an existing token of the first blockchain network;

confirm that the user is an owner of the asset based on a previous asset transfer transaction associated with the user;

verify availability of the asset based on the ZKP and first blockchain network records;

determine that the recipient is a registered user of the second blockchain network;

assign the asset to the first unique identifier of an asset pledge script;

receive a pledge proof request, from the recipient prior to expiration of the deadline, the pledge proof request comprising the first unique identifier; and respond to the pledge proof request with a signature of the first blockchain network;

receive, by a second participating node of the second blockchain network, a claim transaction including the second unique identifier of the asset, the deadline, a second ZKAT encoding the recipient as an owner of the asset, a second ZKP, and a signature of the recipient; and add, by the second participating node of the second blockchain network, the second ZKAT, and the second unique identifier of the asset to the second blockchain network.

14. The non-transitory computer readable medium of claim 13, wherein the asset pledge transaction further comprises the first unique identifier that allows the network to identify the pledged token and sign its content.

15. The non-transitory computer readable medium of claim 13, wherein the first unique identifier is determined according to at least a private key of the user.

16. The non-transitory computer readable medium of claim 13, wherein the identification data of: the user, a recipient, a deadline, the first blockchain network, the second blockchain network as a destination network, asset type, asset value, a second unique identifier of the asset comprises a hiding commitment of the user, the recipient, the deadline, the first blockchain network, the second blockchain network, the asset type, and the asset value, and the second unique identifier.

17. The non-transitory computer readable medium of claim 13, wherein the digital signature of the user comprises an anonymous signature.

\* \* \* \* \*